(12) United States Patent
Peng et al.

(10) Patent No.: US 12,355,860 B2
(45) Date of Patent: Jul. 8, 2025

(54) CORRELATION COEFFICIENT ACQUISITION METHOD, ELECTRONIC DEVICE AND NON-TRANSITORY COMPUTER READABLE STORAGE MEDIUM

(71) Applicant: BAIDU ONLINE NETWORK TECHNOLOGY (BEIJING) CO., LTD., Beijing (CN)

(72) Inventors: Shengbo Peng, Beijing (CN); Jiwen Zhou, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 279 days.

(21) Appl. No.: 18/105,576

(22) Filed: Feb. 3, 2023

(65) Prior Publication Data

US 2023/0254113 A1    Aug. 10, 2023

(30) Foreign Application Priority Data

Feb. 7, 2022   (CN) .......................... 202210116753.3

(51) Int. Cl.
*H04L 9/00* (2022.01)
*H04L 9/08* (2006.01)

(52) U.S. Cl.
CPC ............ *H04L 9/008* (2013.01); *H04L 9/0869* (2013.01)

(58) Field of Classification Search
CPC ... H04L 9/008; H04L 9/0869; H04L 2209/46; H04L 9/00; G06F 21/602; G06F 21/64; G06N 20/00
See application file for complete search history.

(56) References Cited

U.S. PATENT DOCUMENTS

| 2021/0044419 A1* | 2/2021 | Kim ..................... H04L 9/0838 |
| 2022/0021529 A1 | 1/2022 | Chen |
| 2023/0208611 A1* | 6/2023 | Cheon ..................... H04L 9/008 380/28 |

FOREIGN PATENT DOCUMENTS

| CN | 112818290 A | 5/2021 |
| CN | 113515760 A | 10/2021 |

(Continued)

OTHER PUBLICATIONS

Japanese Patent Office, Notice of Reasons for Refusal in corresponding Japanese Application No. 2023-015662 dated Mar. 29, 2024.

(Continued)

*Primary Examiner* — Quazi Farooqui
(74) *Attorney, Agent, or Firm* — Leydig, Voit & Mayer, Ltd.

(57) ABSTRACT

Provided are a correlation coefficient acquisition method, an electronic device, and a non-transitory computer readable storage medium. The implementation scheme is as follows: first original data is acquired, the first original data is homomorphically encrypted by using an associated key to determine first transmission data, where the associated key is jointly agreed by the first participation node and a second participation node; the first transmission data is sent to an auxiliary node so that the auxiliary node receives the first transmission data and performs a homomorphic operation on the first transmission data and second transmission data to obtain correlation coefficients between the first original data and second original data, where the second transmission data is determined by the second participation node homomorphically encrypting the second original data by using the associated key; and the correlation coefficients fed back by the auxiliary node is received.

16 Claims, 6 Drawing Sheets

(56) References Cited

FOREIGN PATENT DOCUMENTS

| | | |
|---|---|---|
| CN | 113806760 A | 12/2021 |
| JP | 2013205796 A | 10/2013 |
| WO | WO 2021/114819 A1 | 6/2021 |

OTHER PUBLICATIONS

Masaya Yasuda et al., "Secure Statistical Analysis Using RLWE-Based Homomorphic Encryption," Lecture Notes in Computer Science, 2015, vol. 9144, pp. 471-487.

Masaya Yasuda et al., "Secret Totalization of Purchase Histories of Companies in Cloud," 2012 year encryption and information security symposium, 2012, pp. 1-8.

European Patent Office, Extended European Search Report in corresponding European Patent Application No. 23155151.6 dated Jun. 14, 2023 (8 pages).

Yohtaro Miyanishi et al., "New Method to Ensure Security to Increase User's Sense of Safety in Cloud Services," 2014 IEEE $11^{the}$ Int'l Conference on Ubiquitous Intelligence and Computing, IEEE Computer Society, pp. 859-866, XP032799003 (Dec. 9, 2014).

\* cited by examiner

CORRELATION COEFFICIENT ACQUISITION METHOD, ELECTRONIC DEVICE AND NON-TRANSITORY COMPUTER READABLE STORAGE MEDIUM

CROSS-REFERENCE TO RELATED APPLICATION

This application claims priority to Chinese Patent Application No. 202210116753.3 filed with the China National Intellectual Property Administration (CNIPA) on Feb. 7, 2022, the disclosure of which is incorporated herein by reference in its entirety.

TECHNICAL FIELD

The present disclosure relates to the field of data processing, for example, the field of big data, deep learning, and artificial intelligence technologies, and particularly, a correlation coefficient acquisition method, an electronic device, and a non-transitory computer readable storage medium.

BACKGROUND

At present, a correlation analysis between data deeply affects a decision-making of people. Especially, for massive data in the Internet, the data may be screened according to the correlation analysis between the data to assist a user in a data processing. For example, during training of a federal learning model, sample data provided by multiple participants need to be aggregated. A correlation analysis between the sample data may be adopted to screen the sample data input into the federal learning model.

SUMMARY

The present disclosure provides a correlation coefficient acquisition method, an electronic device, and a non-transitory computer readable storage medium. According to an aspect of the present disclosure, a correlation coefficient acquisition method is provided. The correlation coefficient acquisition method is applied to a first participation node and includes that: first original data is acquired, the first original data is homomorphically encrypted by using an associated key to determine first transmission data, where the associated key is jointly agreed by the first participation node and a second participation node; the first transmission data is sent to an auxiliary node so that the auxiliary node receives the first transmission data and performs a homomorphic operation the first transmission data and second transmission data to obtain correlation coefficients between the first original data and second original data, where the second transmission data is determined by the second participation node using the associated key for the second original data; and the correlation coefficients fed back by the auxiliary node are received.

According to another aspect of the present disclosure, a correlation coefficient acquisition method is provided. The correlation coefficient acquisition method is applied to an auxiliary node and includes that: first transmission data sent by a first participation node and second transmission data sent by a second participation node is received; a homomorphic operation is performed on the first transmission data and the second transmission data to obtain correlation coefficients between first original data and second original data, where the first transmission data is determined by the first participation node using an associated key for homomorphically encrypting the first original data, the second transmission data is determined by the second participation node using the associated key for homomorphically encrypting the second original data, and the associated key is jointly agreed by the first participation node and the second participation node; and the correlation coefficients are sent to the first participation node and the second participation node.

According to another aspect of the present disclosure, an electronic device is provided. The electronic device includes at least one processor and a memory communicatively connected to the at least one processor. The memory stores an instruction executable by the at least one processor, and the instruction, when executed by the at least one processor, causes the at least one processor to perform the correlation coefficient acquisition method described in any of the embodiments of the present disclosure.

According to another aspect of the present disclosure, a non-transitory computer readable storage medium storing a computer instruction is provided. The computer instruction is configured to cause a computer to perform the correlation coefficient acquisition method described in any of the embodiments of the present disclosure.

It should be understood that the contents described in this section are not intended to identify key or critical features of the embodiments of the present disclosure, nor intended to limit the scope of the present disclosure. Other features of the present disclosure will be readily understood from the following description.

BRIEF DESCRIPTION OF DRAWINGS

The drawings are intended to provide a better understanding of this scheme and are not to be construed as limiting the present disclosure, in which.

DETAILED DESCRIPTION

Exemplary embodiments of the present disclosure are described below with reference to the accompanying drawings, in which various details of embodiments of the present disclosure are included to assist understanding, and which are to be considered as merely exemplary. Therefore, those of ordinary skill in the art will recognize that various changes and modifications of the embodiments described herein may be made without departing from the scope and spirit of the present disclosure. Also, descriptions of well-known functions and structures are omitted in the following description for clarity and conciseness.

Figure 1:
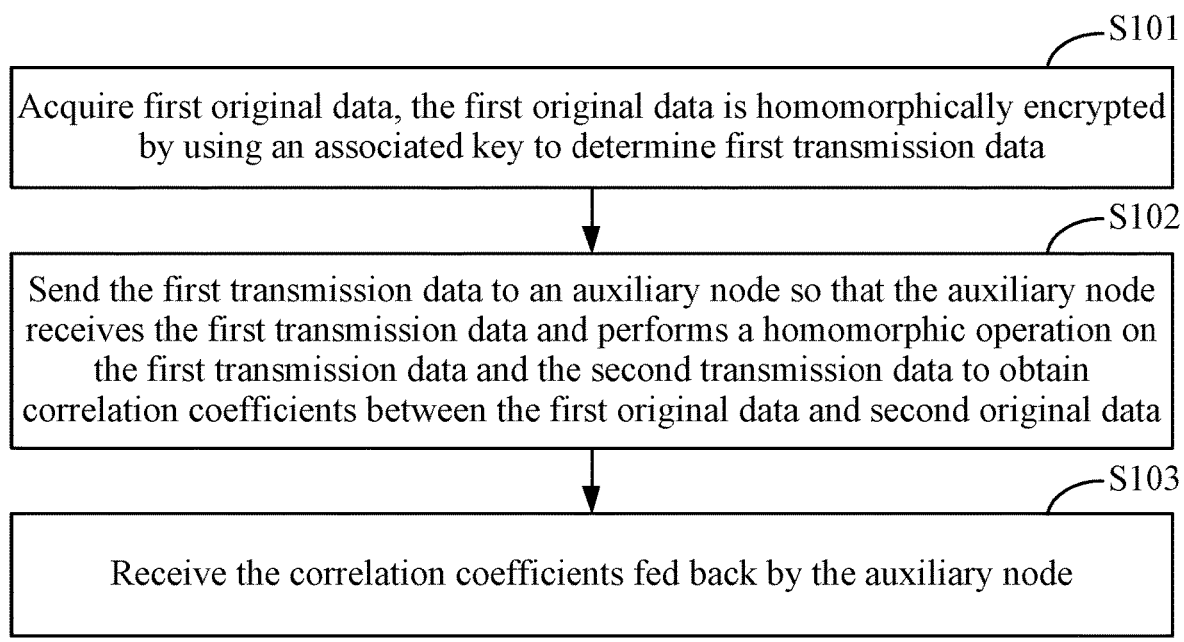
FIG. 1 is a flowchart of a correlation coefficient acquisition method according to an embodiment of the present disclosure.

FIG. 1 is a flowchart of a correlation coefficient acquisition method according to an embodiment of the present disclosure. This embodiment is applicable to a case of calculating a correlation between original data of two participation nodes. The method in this embodiment may be performed by a correlation coefficient acquisition apparatus, this apparatus may be implemented in a software and/or hardware manner and is configured in an electronic device with certain data operation capability, the electronic device is a first participation node, and the electronic device may be a client device or a server device, and the client device is such as a mobile phone, a tablet computer, an in-vehicle terminal, a desktop computer.

In S101, first original data is acquired, the first original data is homomorphically encrypted by using an associated key to determine first transmission data, where the associated key is jointly agreed by the first participation node and a second participation node.

The first original data is used for calculating correlation coefficients. A content of the first original data may be arbitrarily configured, for example, the content of the first original data may be training sample data of a federal learning model; or the content of the first original data may be user behavior data, vehicle driving trajectory data or face image data; or the content of the first original data may be mass data such as advertisement delivery, financial credit or a knowledge graph. The associated key is used for homomorphically encrypting the first original data. The associated key is jointly agreed by the first participation node and the second participation node, that is, only the first participation node and the second participation node may acquire the associated key, and other devices cannot acquire the associated key and cannot decrypt the associated key. Exemplarily, the first participation node and the second participation node may agree and determine the associated key via a key exchange protocol (such as The Diffie-Hellman (DH) protocol). The first participation node and the second participation node are different nodes. Data of the first participation node and data of the second participation node need to be subjected to a correlation calculation. The first transmission data is used for being subjected to a homomorphic operation with second transmission data sent by the second participation node. The first transmission data may refer to data which is provided by the first participation node and is to be subjected to a correlation coefficient calculation, and the first transmission data at least includes homomorphically encrypted first original data.

The homomorphic encryption refers to processing the homomorphically encrypted data to obtain an output, and the output is decrypted, a result of which is the same as an output result obtained by processing unencrypted original data with the same method. In an embodiment, in a case where data is not decrypted, a ciphertext is subjected to an addition operation and/or a multiplication operation, a plaintext corresponding to the ciphertext is subjected to the same operation, and the obtained calculation results are the same.

In S102, the first transmission data is sent to an auxiliary node so that the auxiliary node receives the first transmission data and performs a homomorphic operation on the first transmission data and the second transmission data to obtain correlation coefficients between the first original data and second original data, where the second transmission data is determined by the second participation node using the associated key for homomorphically encrypting the second original data.

The auxiliary node is configured to receive the first transmission data sent by the first participation node, receive the second transmission data sent by the second participation node, and perform the homomorphic operation on the first transmission data and the second transmission data. The second transmission data is used for being subjected to the homomorphic operation with the first transmission data, and the correlation coefficients are obtained through calculation. The second transmission data may refer to data which is provided by the second participation node and is to be subjected to a correlation coefficient calculation, and the second transmission data at least includes homomorphically encrypted second original data. The first transmission data is obtained by homomorphically encrypting the first original data, and the second transmission data is obtained by homomorphically encrypting the second original data, whereby the homomorphic operation being performed on the first transmission data and the second transmission data is equivalent to the homomorphic operation being performed on the first original data and the second original data, that is, output results of correlation coefficients obtained by homomorphic operations of the two ways are the same. The first original data and the second original data are subjected to the homomorphic encryption by using the same associated key, so that the homomorphically encrypted first original data and the homomorphically encrypted second original data are consistent in an encryption mode, and a case that the homomorphic operation cannot be achieved by the encryption result because inconsistent encryption modes are used for the first original data and the second original data is avoided. Therefore, the homomorphic operation between the first transmission data and the second transmission data can be accurately achieved.

In S103, the correlation coefficients are fed back by the auxiliary node is received.

The auxiliary node obtains correlation coefficients between the first transmission data and the second transmission data through calculation, namely, the correlation coefficients between the first original data and the second original data, and feeds the correlation coefficients back to the first participation node and the second participation node. Since the encrypted first original data and the encrypted second original data are calculated by the auxiliary node, the auxiliary nodes cannot obtain real original data; therefore, it can be avoided that the auxiliary node obtains and leaks the original data of the participation nodes, and thus the safety of the original data can be protected.

In the related art, data of two parties are required to calculate the correlation coefficients; however, and data sharing leads to leakage of private information protected in the data.

According to the technical scheme of the present disclosure, the first participation node which participates in calculation of the correlation coefficients homomorphically encrypts the first original data to determine the first transmission data and sends the first transmission data to the auxiliary node of a third party, and the auxiliary node performs the homomorphic operation on the first transmission data and the second transmission data, which is equivalent to that the auxiliary node performs the homomorphic operation on homomorphically encrypted first original data and homomorphically encrypted second original data to obtain correlation coefficients between the homomorphically encrypted first original data and the homomorphically encrypted second original data through calculation, whereby the correlation coefficients between the first original data and the second original data are determined. Thus, in a case where the auxiliary node cannot decrypt the transmission data, the correlation coefficients between the original data can be accurately calculated, the safety of the original data is improved, privacy information is protected, the data transmission safety and the calculation safety are improved, and meanwhile, the calculation accuracy of the correlation coefficients is improved.

Figure 2:
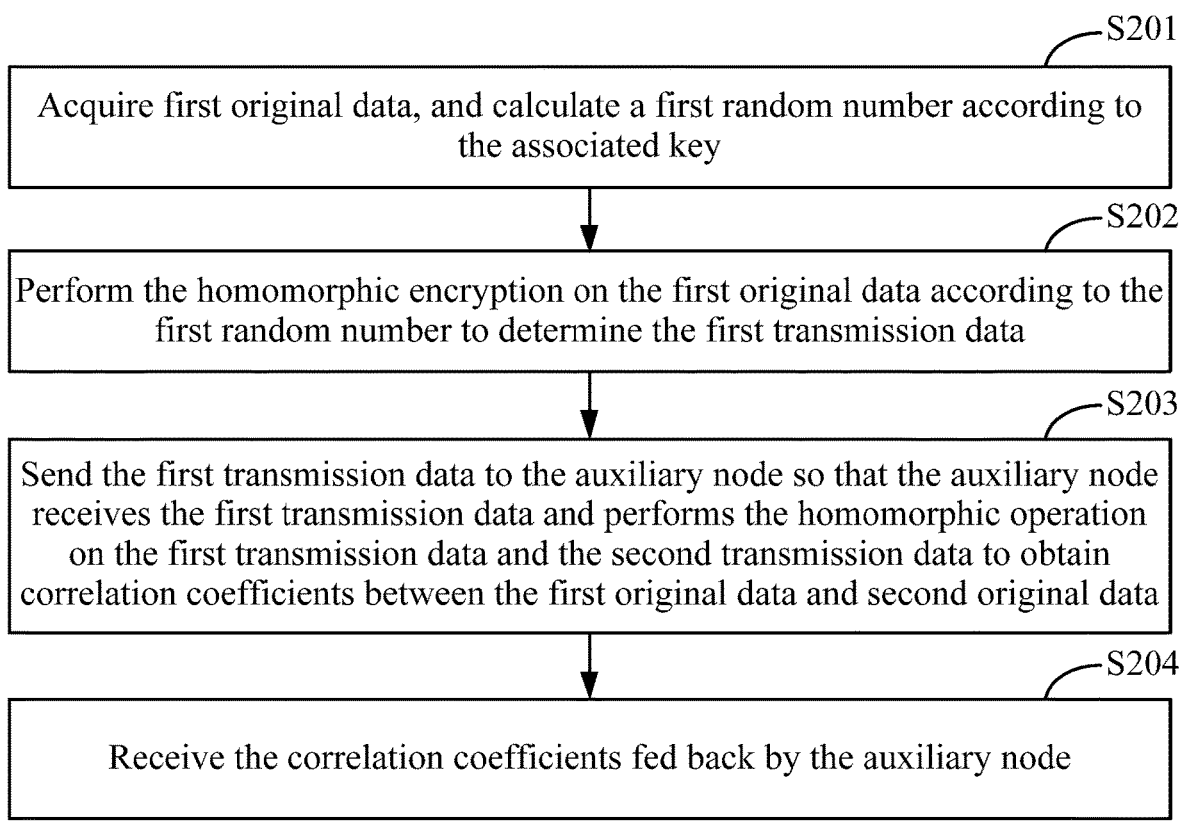
FIG. 2 is a flowchart of a correlation coefficient acquisition method according to an embodiment of the present disclosure.

FIG. 2 is a flowchart of another correlation coefficient acquisition method according to an embodiment of the present disclosure, which is further optimized and expanded based on the above-described technical scheme, and may be combined with each of the above-described optional implementations. That the first original data is homomorphically encrypted by using the associated key is embodied as follows: a first random number is calculated according to the associated key; and the first original data is homomorphically encrypted according to the first random number.

In S201, the first original data is acquired, and a first random number is calculated according to the associated key, where the associated key is jointly agreed by the first participation node and the second participation node.

The first random number is used for homomorphically encrypting the original data. The first random number is a random number generated according to the associated key. The first participation node generates the first random number according to the associated key, and likewise, the second participation node generates the first random number according to the associated key in the same manner. The original data may include at least one piece of data. Accordingly, a number of the first random numbers is the same as a number of data included in the original data.

In S202, the first original data is homomorphically encrypted according to the first random number to determine the first transmission data.

The first original data is a data sequence, the first random number is a data sequence, and a first random number of a certain rank may be used for homomorphically encrypting first original data of the same rank according to the ranks of the data in the sequence. Exemplarily, the first original data includes N samples $X_i$, where i=1, 2, 3 . . . N, and accordingly, N random numbers $R=\{r_i | r_i \in Z\}$ may be generated according to the associated key, where $r_i$ is used for encrypting $X_i$. Exemplarily, the homomorphically encrypted first original data is $r_i * X_i$.

Moreover, in the second participation node, the first random number is generated based on the associated key and a same random number generation manner. Therefore, the homomorphic encryption of the first original data and the second original data is achieved by adopting the same first random number, and thus a condition that the homomorphic operation cannot be achieved due to different random numbers is avoided.

It should be noted that the two participation nodes generate the same first random number, and the first random number is used for homomorphically encrypting the original data, rather than using the same encryption manner to perform encryption separately. Exemplarily, in a calculation process of the correlation coefficients, it is necessary to multiply the first original data by the second original data, the encryption manner of the first original data may be that the first random number is multiplied by the first original data, and the encryption manner of the second original data may be that the second original data is multiplied by a reciprocal of the first random number. Therefore, in the calculation process of the correlation coefficients, since a product of the first random number and the reciprocal of the first random number is 1, and a product of the first original data and the second original data is the same as a product of the encrypted first original data and the encrypted second original data, whereby the homomorphic operation is achieved.

In S203, the first transmission data is sent to the auxiliary node so that the auxiliary node receives the first transmission data and performs the homomorphic operation on the first transmission data and the second transmission data to obtain correlation coefficients between the first original data and second original data, where the second transmission data is determined by the second participation node using the associated key for homomorphically encrypting the second original data.

In S204, the correlation coefficients fed back by the auxiliary node is received.

In an embodiment, the correlation coefficient acquisition method further includes that: a sample data set for training a federal model includes the first original data, and the first original data included in the sample data set is screened according to the correlation coefficients between the first original data and the second original data.

The sample data set includes the first original data. The sample data set is a data set of training samples of the federal model. The federal model refers to an optimal model established by aggregating sample data of at least two participants, and the data of the participants do not give own data when the model is trained, so that local data cannot be leaked. The federal model may include a horizontal federal model, a vertical federal model, a federal migration model, and the like. Exemplarily, screening of the first original data may be selecting original data with a low correlation from the sample data set for removing, or selecting original data with a high correlation for removing. The screening manner may be determined according to the performance requirement information of the trained federal model.

In an application scenario of training the federal model, the samples may be screened according to the correlation between samples of two participants, so that the representativeness of the samples may be improved, and thus the detection accuracy of the federal model is improved. Meanwhile, the data volume of the samples may be reduced through screening the samples, the training efficiency of the federal model is improved, and moreover, during the correlation calculation, the original data is encrypted, so that the safety of data of the participants may be improved, and the safety of data of the federal model is further enhanced.

According to the technical schemes of the present disclosure, the first random number is further generated through the associated key, and the homomorphic encryption is performed on the first original data based on the first random number, so that the randomness of the encrypted data is increased, the difficulty of decrypting the encrypted data is improved, the encryption complexity is further improved, and the safety of the original data is improved.

Figure 3:
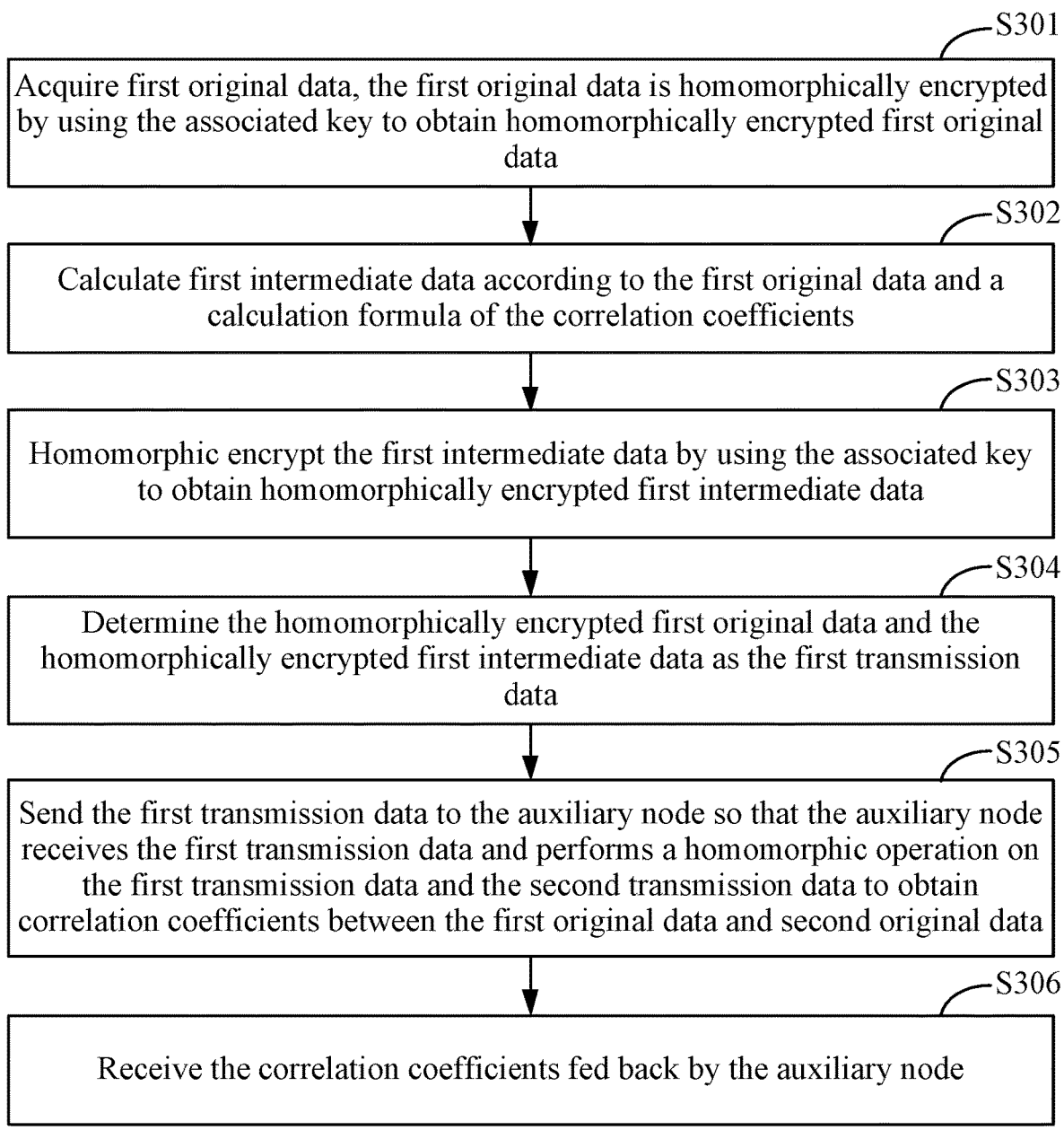
FIG. 3 is a flowchart of a correlation coefficient acquisition method according to an embodiment of the present disclosure.

FIG. 3 is a flowchart of another correlation coefficient acquisition method according to an embodiment of the present disclosure, which is further optimized and expanded based on the above-described technical scheme, and may be combined with each of the above-described optional implementations. That the first original data is homomorphically encrypted by using the associated key to determine the first transmission data is embodied as follows: the first original data is homomorphically encrypted by using the associated key to obtain homomorphically encrypted first original data; first intermediate data is calculated according to the first original data and a calculation formula of the correlation coefficients; the first intermediate data is homomorphically encrypted by using the associated key to obtain homomorphically encrypted first intermediate data; and the homomorphically encrypted first original data and the homomorphically encrypted first intermediate data are determined as the first transmission data.

In S301, the first original data is acquired, and the first original data is homomorphically encrypted by using the associated key to obtain homomorphically encrypted first original data, where the associated key is jointly agreed by the first participation node and the second participation node.

In S302, first intermediate data is calculated according to the first original data and a calculation formula of the correlation coefficients.

In the calculation formula of the correlation coefficients, a multi-layer operation may be performed on the first original data, and a result of part of operations may be determined as the intermediate data. The first intermediate data is used for directly calculating the correlation coefficients. The first intermediate data refers to a calculation result obtained by calculating the original data according to a calculation formula related to the original data in the calculation formula of the correlation coefficients. For example, the first original data includes multiple samples, and the multi-layer operation may be performed on the samples to obtain a variance or an expectation and the like of the first original data which are determined as the first intermediate data. Due to a fact that numerical values used for encryption among multiple pieces of data in the first original data are different, results of expectation, variance and the like calculated based on the original data are different from results of expectation, variance and the like calculated based on the encrypted first original data, and the homomorphic operation cannot be achieved. Thus, it is necessary to calculate the intermediate data based on the original data so as to ensure the accuracy of the intermediate data used for calculating the correlation coefficients, avoid affecting the homomorphic operation of the correlation coefficients, and avoid affecting the accuracy of the correlation coefficients.

In an embodiment, the first intermediate data includes an expectation of the first original data and/or a variance of the first original data.

The usual expectation and/or variance is used for calculating the correlation coefficients, and is used as data calculated directly in the calculation formula of the correlation coefficients and as an intermediate result of calculating the correlation coefficients based on the first original data.

Exemplarily, a calculation formula of a Pearson correlation coefficient or a Spearman correlation coefficient is shown below:

$$\rho_{X,Y} = \frac{E((X - u_X)(Y - u_Y))}{\sigma_X \sigma_Y} = \frac{E(XY) - E(X)E(Y)}{\sigma_X \sigma_Y}$$

X is the first original data, Y is the second original data, E(X) is the expectation of the first original data, E(Y) is an expectation of the second original data, $\sigma_X$ is the variance of the first original data, and $\sigma_Y$ is a variance of the second original data. E(XY) is an expectation of a product of the first original data and the second original data.

As in the previous example, the first original data of the first participation node is $X_i$, the second original data of the second participation node is $Y_i$, and the first random number generated according to the associated key is $r_i$. The homomorphic encryption is performed on the first original data and the second original data by using the first random number. Each piece of data in the first original data is multiplied by the first random number to obtain the homomorphically encrypted first original data $X_i*r_i$, and each piece of data in the second original data is multiplied by the reciprocal of the first random number to obtain homomorphically encrypted second original data $Y_i/r_i$.

Correspondingly, $E((X*R)*(Y/R))=E(XY)$, i.e., an expectation of a product of the homomorphically encrypted first original data and the homomorphic ally encrypted second original data is equal to the expectation of the product of the first original data and the second original data.

The first intermediate data of the first participation node is homomorphically encrypted by using the second random number, and the second intermediate data of the second participation node is homomorphically encrypted by using the second random number. The intermediate data includes an expectation and a variance, and the second random number includes $r_e$ corresponding to the expectation and $r_\sigma$ corresponding to the variance. A first expectation included in the first intermediate data is multiplied by the second random number corresponding to the expectation to obtain a homomorphically encrypted first expectation $E(X)*r_e$. A second expectation included in the second intermediate data is multiplied by a reciprocal of the second random number corresponding to the expectation to obtain a homomorphically encrypted second expectation $E(Y)/r_e$. A first variance included in the first intermediate data is multiplied by the second random number corresponding to the expectation to obtain a homomorphically encrypted first variance $\sigma(X)*r_\sigma$. A second expectation included in the second intermediate data is multiplied by the reciprocal of the second random number corresponding to the expectation to obtain a homomorphically encrypted second variance $\sigma(Y)/r_\sigma$.

Correspondingly, $E2(X)*E2(Y)=(E(X)*r_e)*(E(Y)/r_e)=E(X)*E(Y)$. That is, a product of the homomorphically encrypted first expectation E2(X) and the homomorphically encrypted second expectation E2(Y) is equal to a product of the first expectation and the second expectation. $\sigma2(X)*\sigma2(Y)=(\sigma(X)*r_\sigma)*(\sigma(Y)/r_\sigma)=\sigma(X)*\sigma(Y)$. That is, a product of the homomorphically encrypted first variance $\sigma2(X)$ and the homomorphically encrypted second variance $\sigma2(Y)$ is equal to a product of the first variance and the second variance.

Thus, the result of the correlation coefficients does not change before and after the homomorphic encryption.

The first intermediate data is configured as the expectation and variance of the first original data so that an application scenario of the correlation coefficients such as Pearson correlation coefficient and Spearman correlation coefficient may be adapted, correlation coefficients adopting the same calculation manner are calculated, the application scenario of the correlation coefficients is increased, and the safety of data required for calculation of the correlation coefficients is improved.

In S303, t the first intermediate data is homomorphically encrypted by using the associated key to obtain homomorphically encrypted first intermediate data.

Likewise, the first intermediate data is homomorphically encrypted by using the associated key. The first intermediate data calculated based on the first original data still needs to be encrypted, so that privacy information of the original data is prevented from being leaked.

In an embodiment, that the first intermediate data is homomorphically encrypted by using the associated key to obtain the homomorphically encrypted first intermediate data includes the following: a second random number is calculated according to the associated key; and the first intermediate data is homomorphically encrypted according to the second random number to obtain the homomorphically encrypted first intermediate data.

The second random number is calculated according to the associated key. The first random number is different from the second random number. The second random number is used for homomorphically encrypting the first intermediate data. The first intermediate data is a data sequence, the second random number is a data sequence, and a second random number of a certain rank may be used for homomorphically encrypting first immediate data of the same rank according to the ranks of the data in the sequence. Indeed, the first intermediate data may include various types of data, and second random numbers corresponding to different types of data are different.

The second random number is further generated through the associated key, and the first intermediate data is homomorphically encrypted based on the second random number, whereby the randomness of the encrypted data is increased, the difficulty of cracking the encrypted data is improved, the complexity of encryption is further improved, and thus the safety of the intermediate data is improved.

In S304, the homomorphically encrypted first original data and the homomorphically encrypted first intermediate data are determined as the first transmission data.

The homomorphically encrypted first original data and the homomorphically encrypted first intermediate data may be further encrypted to obtain the first transmission data so as to improve the safety of the first transmission data. Exemplarily, a key pair may be formed by a public key (n, e) and a private key (n, d) through an RSA asymmetric encryption algorithm.

In an embodiment, that the homomorphically encrypted first original data and the homomorphically encrypted first intermediate data are determined as the first transmission data includes the following: a public key sent by the auxiliary node is acquired; and the homomorphically encrypted first intermediate data is encrypted according to the public key, and the homomorphically encrypted first original data and the public-key encrypted first intermediate data are determined as the first transmission data so that the auxiliary node decrypts the public-key encrypted first intermediate data by using the private key to obtain the homomorphically encrypted first intermediate data.

The public key and the private key form the key pair, and the key pair is a key generated by an asymmetric encryption. The public key is public and the private key is secret. The auxiliary node generates the key pair, sends the public key to each participation node, and reserves the private key locally. The participation node encrypts the data by using the public key, and the auxiliary nodes may decrypt the data by using the private key to obtain the data.

The first participation node encrypts the homomorphically encrypted first intermediate data by using the public key, so that the safety of the intermediate data may be further improved. Generally, the first intermediate data is a calculation result of the first original data, a number of data included in the first intermediate data is less than a number of data included in the first original data, and a homomorphic encryption result of the first intermediate data is easier to crack compared with a homomorphic encryption result of the first original data, whereby the first intermediate data may be preferentially encrypted, the safety of the first intermediate data is improved, and meanwhile, the first intermediate data is encrypted without encrypting the first original data, so that encrypted data volumes may be reduced, the encryption cost is reduced, and the encryption efficiency is improved.

Exemplarily, the first intermediate data is the expectation of the first original data, and a homomorphic encryption manner of the first original data is that: the encryption is performed by using data included in the first original data and the first random number. Encryption offset of each piece of data included in the first original data is different, whereby the homomorphically encrypted first original data is more difficult in terms of crack and thus is safer. However, the first intermediate data is only one piece of data, and the second random number is used for encryption, only one encrypted data may be obtained, so that the decryption is easy. Therefore, the first intermediate data is encrypted again, and thus the safety of the first intermediate data may be further improved.

In an example, the expectation $E(X)$ is encrypted with the public key (n, e), whereby an expectation obtained by the encryption is $(E(X))^e \% n$.

A public key encryption is performed on the first intermediate data, so that the decryption difficulty is increased for devices other than the auxiliary node, and thus the safety of the first intermediate data is improved, and meanwhile, encrypted data volumes may be reduced, the encryption cost is reduced, and the encryption efficiency is improved.

In S305, the first transmission data is sent to the auxiliary node so that the auxiliary node receives the first transmission data and performs a homomorphic operation on the first transmission data and the second transmission data to obtain correlation coefficients between the first original data and second original data, where the second transmission data is determined by the second participation node homomorphically encrypting the second original data by using the associated key.

In S306, the correlation coefficients fed back by the auxiliary node are received.

According to the technical scheme of the present disclosure, the first intermediate data associated with the calculation of the correlation coefficients is calculated based on the first original data and according to the calculation formula of the correlation coefficients, and the homomorphic encryption is performed on the first intermediate data, so that an operation of the correlation coefficients is ensured to be the homomorphic operation, the homomorphic operation of the correlation coefficients is achieved, the calculation accuracy of the correlation coefficients may be improved, and moreover, the safety of the first intermediate data and the safety of the first transmission data are improved through the homomorphic encryption.

Figure 4:
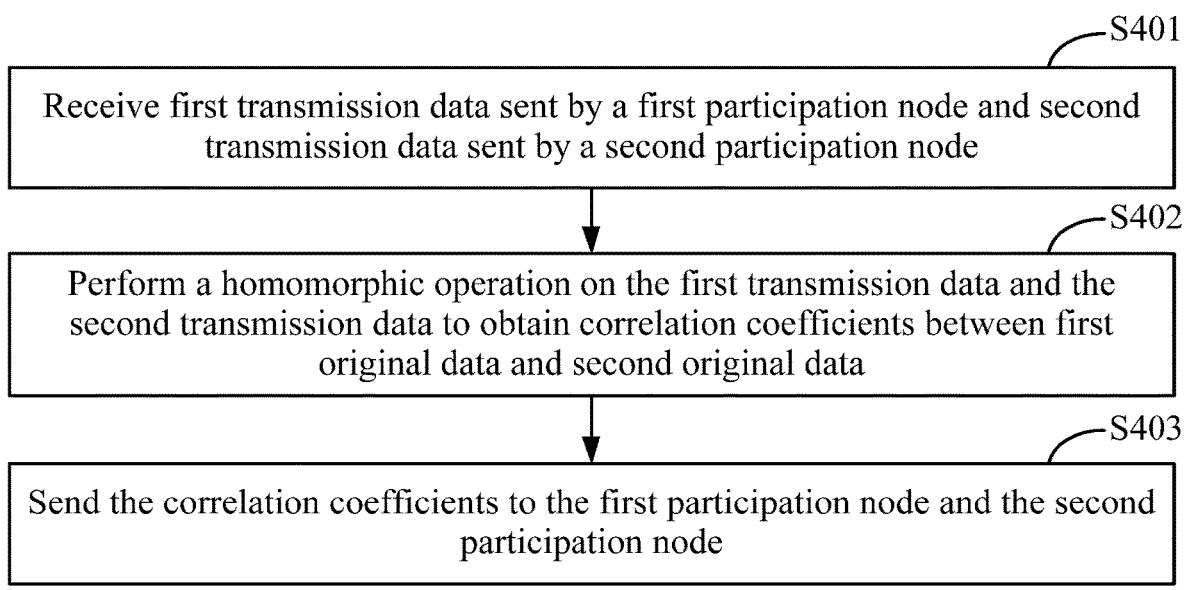
FIG. 4 is a flowchart of a correlation coefficient acquisition method according to an embodiment of the present disclosure.

FIG. 4 is a flowchart of a correlation coefficient acquisition method according to an embodiment of the present disclosure. This embodiment is applicable to a case of calculating a correlation between original data of two participation nodes. The method in this embodiment may be performed by a correlation coefficient acquisition apparatus, this apparatus may be implemented in a software and/or hardware manner and is configured in an electronic device with certain data operation capability, the electronic device is an auxiliary node, and the electronic device may be a client device or a server device, and the client device is such as a mobile phone, a tablet computer, an in-vehicle terminal, a desktop computer.

In S401, first transmission data sent by a first participation node and second transmission data sent by a second participation node are received.

The auxiliary node is configured to homomorphically encrypt the transmission data between every two nodes among multiple participation nodes, calculate correlation coefficients of original data corresponding to the transmission data, and feed the correlation coefficients back to a corresponding participation node. At least two participation nodes and the auxiliary nodes are included in a calculation system of the correlation coefficients. The auxiliary node is configured to calculate the correlation coefficients, and the participation nodes are configured to provide homomorphically encrypted data for calculating the correlation coefficients. Since the first transmission data and the second transmission data are homomorphically encrypted data, the auxiliary node cannot acquire the original data, and thus the safety of the original data is ensured.

In S402, a homomorphic operation is performed on the first transmission data and the second transmission data to obtain correlation coefficients between first original data and second original data, where the first transmission data is determined by the first participation node homomorphically encrypting the first original data by using an associated key, the second transmission data is determined by the second participation node homomorphically encrypting the second original data by using the associated key, and the associated key is jointly agreed by the first participation node and the second participation node.

In S403, the correlation coefficients are sent to the first participation node and the second participation node.

The correlation coefficients may also be transmitted in an encrypted manner for the purpose of safe transmission of the correlation coefficients.

In an embodiment, that the homomorphic operation is performed on the first transmission data and the second transmission data includes the following: a key pair is acquired, where a public key in the key pair is used for being sent to the first participation node and the second participation node for a data encryption; public-key encrypted first intermediate data in the first transmission data is decrypted according to a private key in the key pair to obtain homomorphically encrypted first intermediate data; public-key encrypted second intermediate data in the second transmission data is decrypted according to the private key in the key pair to obtain homomorphically encrypted second intermediate data; and the homomorphic operation is performed on the homomorphically encrypted first intermediate data, homomorphically encrypted first original data included in the first transmission data, the homomorphically encrypted second intermediate data, and homomorphically encrypted second original data included in the second transmission data.

The intermediate data is encrypted twice, i.e., firstly a homomorphic encryption of the associated key, and then an encryption of the public key. The public-key encrypted intermediate data may be decrypted by the private key to obtain homomorphically encrypted intermediate data of the associated key. The homomorphically encrypted first intermediate data, the homomorphically encrypted first original data, the homomorphically encrypted second intermediate data and the homomorphically encrypted second original data are used for homomorphically calculating to obtain the correlation coefficients between the first original data and the second original data.

Exemplarily, the key pair including a public key (n, e) and a private key (n, d) may be generated by an RSA algorithm. The encrypted expectation $(E(X))^e \% n$ is decrypted with the private key (n, d), i.e., $((E(X))^e \% n)^d \% n = E(X)$.

A public key encryption is performed on the first intermediate data, so that the decryption difficulty is increased for devices other than the auxiliary node, and thus the safety of the first intermediate data is improved, and meanwhile, encrypted data volumes may be reduced, the encryption cost is reduced, and the encryption efficiency is improved.

According to the technical scheme of the present disclosure, the homomorphic operation is performed on homomorphically encrypted first transmission data and homomorphically encrypted second transmission data through the auxiliary node to obtain the correlation coefficients between the first original data and the second original data before the homomorphic encryption, so that in a case where the auxiliary node cannot decrypt the transmission data, the correlation coefficients between the original data are accurately calculated, the safety of the original data is improved, privacy information is protected, the data transmission safety and the calculation safety are improved, and meanwhile, the calculation accuracy of the correlation coefficients is improved.

Figure 5:
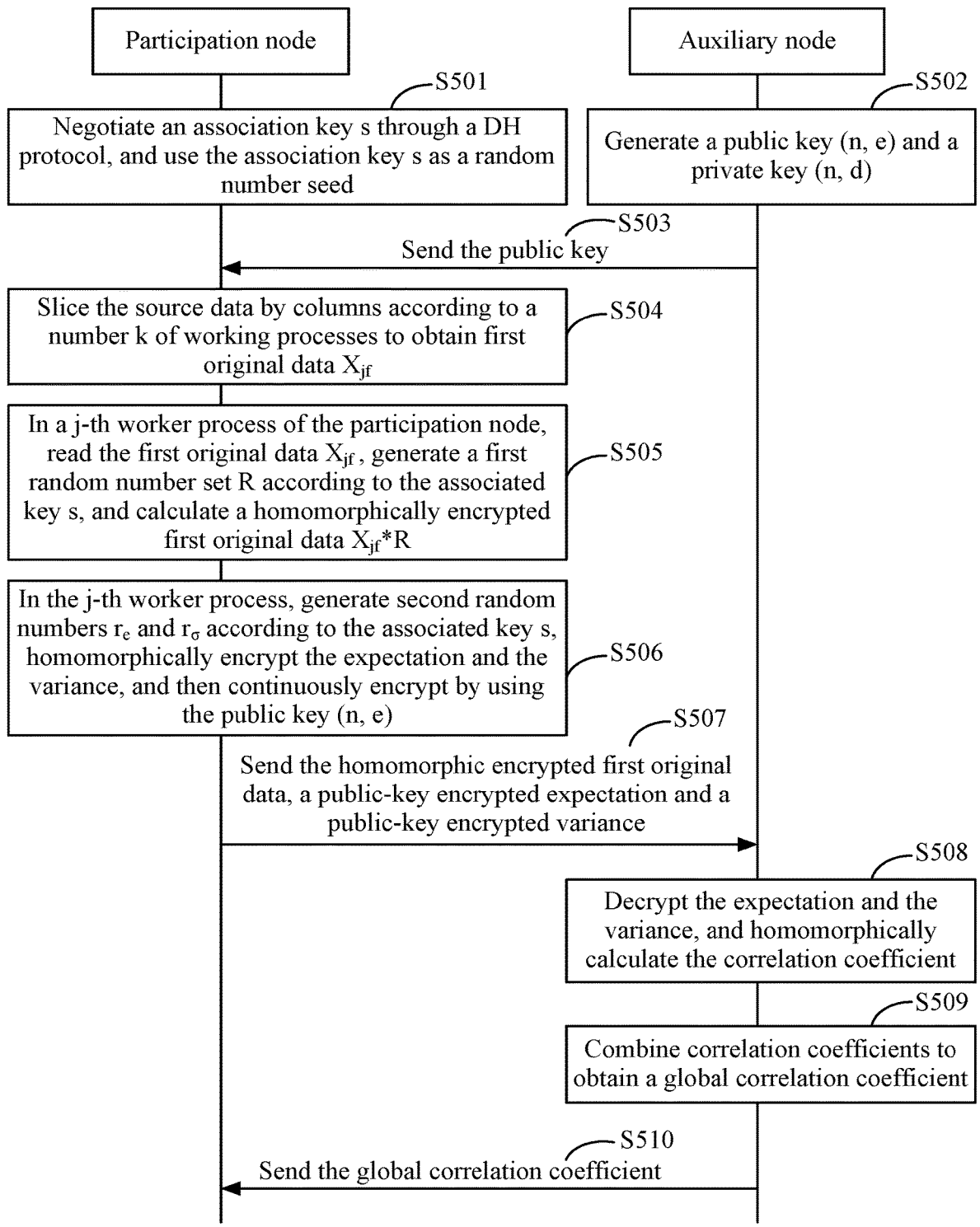
FIG. 5 is a scenario diagram of a correlation coefficient acquisition method according to an embodiment of the present disclosure.

FIG. 5 is a scenario diagram of a correlation coefficient acquisition method according to an embodiment of the present disclosure.

The participant includes k Worker working processes for processing the original data. The auxiliary node is an Arbiter node. In the federal learning framework, there are three classes of nodes, a participation node (Host), an auxiliary node (Arbiter), and an application node (Guest). The participation node is configured to provide data, the auxiliary node is configured to assist the participant to complete the joint modeling, and the application node is configured to initiate a modeling operation.

The correlation coefficient acquisition method involves the participation node and the auxiliary node. In an embodiment, the flow of the correlation coefficient acquisition method is as follows.

In S501, the participation node negotiates an associated key s with other participation nodes through a DH protocol, and the associated key is used as a random number seed.

In an embodiment, a participant Pa and a participant Pb generate a negotiation key s through the DH protocol, where a,b=1, 2, 3 . . . d, a≠b, and d is a total number of participation nodes.

In S502, the auxiliary node generates a public key (n, e) and a private key (n, d).

The key pair may be generated based on the RSA algorithm.

In S503, the auxiliary node sends the public key (n, e) to each participation node.

In S504, the participation node slices the source data by columns according to a number k of Worker working processes to obtain first original data $X_{jf}$.

The source data includes at least one piece of original data, one piece of original data includes at least one data sequence. The participant averagely slices the source data according to the number k of included working processes to obtain $X_{jfg}$, where j=1, 2, 3 . . . k, f=1, 2, 3 . . . m, m is column data for calculating the correlation coefficients, that is, the same number as the original data, and indeed, one column of data is one piece of original data, g=1, 2, 3 . . . N, and N is a total number of samples included in one piece of original data. N $X_{jfg}$ form one piece of original data $X_{jf}$. One working process may process at least one piece of original data.

In S505, in a j-th working process of the participation node, the first original data $X_{jf}$ is read, a first random number set R is generated according to the associated key s, and a homomorphically encrypted first original data $X_{jf}*R$ is calculated.

In the j-th working process of the participation node, N random numbers $R=\{r_i|r_i \in Z\}$ are generated by using the associated key s as the random number seed, and $X_{jfg}*r_i$ is calculated. A number of random numbers is the same as the total number of samples included in the original data and is N.

In S506, in the j-th working process of the participation node, second random numbers $r_e$ and $r_\sigma$ are generated according to the associated key s, and the expectation and the variance are homomorphically encrypted and then are continuously encrypted by using the public key (n, e).

In the j-th working process of the participation node, the expectation $E(X_{jf})$ and the variance $\sigma(X_{jf})$ are calculated according to $X_{jfg}$ included in one piece of original data. The second random number $r_e$ and $r_\sigma$ are generated based on the associated key s, and the homomorphic encryption is performed on the expected $E(X_{jf})$ by using the second random number $r_e$ to obtain $E(X_{jf})*r_e$. The homomorphic encryption is performed on the variance $\sigma(X_{jf})$ by using the second random number $r_\sigma$ to obtain $\sigma(X_{jf})*r_\sigma$. Two second random numbers $r_e$ and $r_\sigma$ are different. The homomorphically encrypted $E(X_{jf})$ is encrypted by using the public key to obtain $(E(X_{jf})*r_e)^e\%$ n. The homomorphically encrypted $\sigma(X_{jf})$ is encrypted by using the public key (n, e) to obtain $(\sigma(X_{jf})*r_\sigma)^e\%$ n.

In S507, the participation node sends the homomorphic encrypted first original data, a public-key encrypted expectation and a public-key encrypted variance to the auxiliary node.

In S508, the auxiliary node decrypts the expectation and the variance, and homomorphically calculates the correlation coefficients.

The auxiliary node decrypts the public-key encrypted expectation and the public-key encrypted variance by using the private key to obtain the homomorphic encrypted expectation and the homomorphic encrypted variance. Correlation coefficients between the original data of two participation nodes are calculated according to the homomorphically encrypted original data, the homomorphically encrypted expectation and the homomorphically encrypted variance, and the homomorphically encrypted original data, the homomorphically encrypted expectation and the homomorphically encrypted variance sent by other participation nodes.

The auxiliary node receives first transmission data of the first participation node a, including $X_{jfg}*r_i$, $(E(X_{jf})*r_e)^e\%$ n and $(\sigma(X_{jf})*r_\sigma)^e\%$ n, and receives second transmission data of the second participation node b, including $Y_{hpq}/r_i$, $(E(Y_{hp})/r_e)^e\%$ n and $(\sigma(Y_{hp})/r_\sigma)^e\%$ n, where h=1, 2, 3 . . . t, p=1, 2, 3 . . . u, t is a number of working processes included in the second participation node, u is column data for calculating the correlation coefficients, i.e. is the same number as the original data. Indeed, a column of data is one piece of original data, q=1, 2, 3 . . . N, and N is the total number of samples included in one piece of original data. N $Y_{hpq}$ form one piece of original data $Y_{hp}$. One working process may process at least one piece of original data.

The correlation coefficient is calculated mainly in three parts, i.e., E(XY), E(X)*E(Y) and $\sigma(X)*\sigma(Y)$.

An expectation and a variance are decrypted by using the private key (n, d) as follows:

$((E(X_{jf})*r_e)^e\% n)^d\% n = E((X_{jf})*r_e$ $((\sigma(X_{jf})*r_\sigma)^e\% n)^d\% n = \sigma((X_{jf})*r_\sigma$ $((E(Y_{hp})/r_e)^e\% n)^d\% n = E(Y_{hp})/r_e$ $((\sigma(Y_{hp})/r_\sigma)^e\% n)^d\% n = \sigma(Y_{hp})/r_\sigma.$ In the homomorphic operation, $E((X_{jfg}*r_i)*(Y_{hpq}/r_i)) = E(X_{jfg}*Y_{hpq})$ $(E(X_{jf})*r_e)*(E(Y_{hp})/r_e) = E(X_{jf})*E(Y_{hp})$ $(\sigma(X_{jf})*r_\sigma)*(\sigma(Y_{hp})/r_\sigma) = \sigma(X_{jf})*\sigma(Y_{hp}).$ A calculation result of the ciphertext is the same as a calculation result of the plaintext, and is calculated by substituting the following formula:

$$\rho_{X,Y} = \frac{E(XY) - E(X)E(Y)}{\sigma_X \sigma_Y}$$

The correlation coefficients between the first original data $X_{jf}$ and the second original data $Y_{hp}$ are thus accurately calculated.

In S509, the correlation coefficients are combined by the auxiliary node to obtain a global correlation coefficient.

The correlation coefficient at this time is a correlation coefficient between one piece of original data and another piece of original data. However, the source data actually includes multiple pieces of original data. The correlation coefficients between multiple pieces of original data and corresponding pieces of original data are combined to form a data set, and the data set may be determined as the global correlation coefficient.

In S510, the auxiliary node sends the global correlation coefficient to the participating nodes.

The participation node screens the source data according to the global correlation coefficient, and applies the screened source data to the training of the federal learning model.

A federal learning algorithm generally ensures the safety of the data through cryptographic techniques, and additional cryptographic operations greatly reduce the efficiency of the algorithm. Moreover, a federal learning process requires frequent communications between the participants, so that the efficiency of learning is further reduced. How to improve the efficiency of the federal algorithm is especially important when the traffic data volume is relatively large.

In the embodiments of the present disclosure, multiple calculating tasks (working processes) are started on the server of the same participant, data division, parameter distribution and result aggregation are performed through the data of the participant participating in training, and data reading, expectation and variance calculation and the like are performed through the Worker working process. Such a task parallelism mechanism greatly improves the efficiency of federal learning. The parallel of multiple Worker tasks can fully utilize resources such as a CPU (central processing unit) and bandwidth of the server. In addition, due to the memory allocation mechanism of a Java virtual machine (JVM) and a storage system, multiple Worker tasks can also make fully utilize the memory resources of the server.

The algorithm in the embodiments of the present disclosure may be referred to as a parallel federal correlation coefficient algorithm (PFCC), which ensures a secure aggregation of data of the participants by mixing noise through the DH and RSA protocols and encrypting the original data. The encryption and decryption process is simple and the space-time complexity is relatively small.

Figure 6:
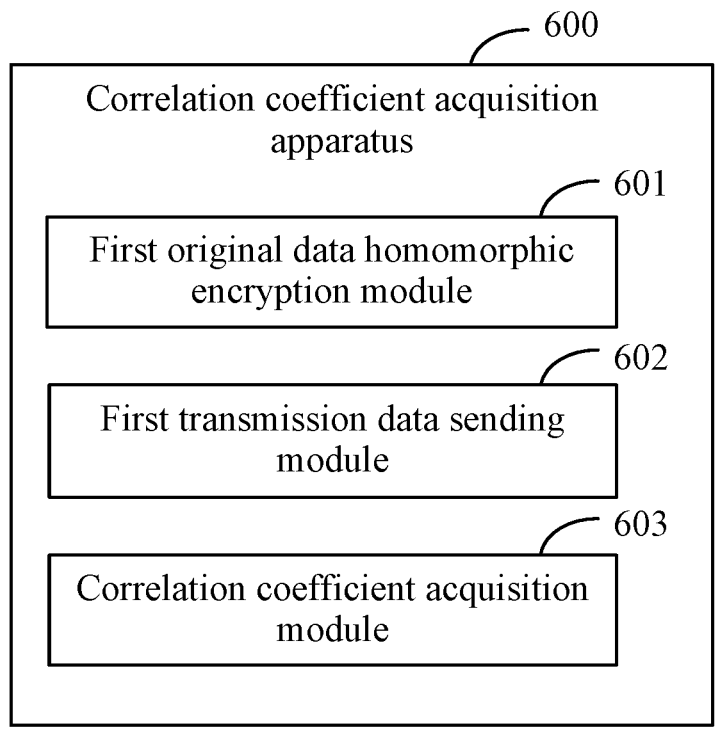
FIG. 6 is a schematic diagram of a correlation coefficient acquisition apparatus according to an embodiment of the present disclosure.

According to the embodiments of the present disclosure, FIG. 6 is a structural diagram of a correlation coefficient acquisition apparatus in an embodiment of the present disclosure, and the embodiment of the present disclosure is applicable to a case where a correlation between original data of two participation nodes is calculated. The apparatus is implemented by software and/or hardware and is configured in an electronic device with certain data operation capability, and the electronic device is the participation node.

As shown in FIG. 6, a correlation coefficient acquisition apparatus 600 includes a first original data homomorphic encryption module 601, a first transmission data sending module 602, and a correlation coefficient acquisition module 603. The first original data homomorphic encryption module 601 is configured to acquire first original data, and homomorphically encrypt the first original data by using an associated key to determine first transmission data, where the associated key is jointly agreed by the first participation node and a second participation node. The first transmission data sending module 602 is configured to send the first transmission data to an auxiliary node so that the auxiliary node receives the first transmission data and performs a homomorphic operation on the first transmission data and second transmission data to obtain a correlation coefficients between the first original data and second original data, where the second transmission data is determined by the second participation node homomorphically encrypting the second original data by using the associated key. The correlation coefficient acquisition module 603 is configured to receive the correlation coefficients fed back by the auxiliary node.

According to the technical scheme of the present disclosure, the first participation node which participates in calculation of the correlation coefficients homomorphically encrypts the first original data to determine the first transmission data, and sends the first transmission data to the auxiliary node of a third party. The auxiliary node performing the homomorphic operation on the first transmission data and the second transmission data is equivalent to the auxiliary node performing the homomorphic operation on homomorphically encrypted first original data and homomorphically encrypted second original data, and correlation coefficients between the homomorphically encrypted first original data and the homomorphically encrypted second original data are obtained through calculation, whereby the correlation coefficients between the first original data and the second original data are determined, so that in a case where the auxiliary node cannot decrypt the transmission data, the correlation coefficients between the original data are accurately calculated, the safety of the original data is improved, privacy information is protected, the data transmission safety and the calculation safety are improved, and meanwhile, the calculation accuracy of the correlation coefficients is improved.

Further, the first original data homomorphic encryption module 601 includes a first random number calculation unit and a first random number encryption unit. The first random number calculation unit is configured to calculate a first random number according to the associated key. The first random number encryption unit is configured to homomorphically encrypt the first original data according to the first random number.

Further, the first original data homomorphic encryption module 601 includes a data homomorphic encryption unit, a first intermediate data calculation unit, a first intermediate data homomorphic encryption unit, and a first transmission data determination unit. The data homomorphic encryption unit is configured to homomorphically encrypt the first original data by using the associated key to obtain homomorphically encrypted first original data. The first intermediate data calculation unit is configured to calculate first intermediate data according to the first original data and a calculation formula of the correlation coefficients. The first intermediate data homomorphic encryption unit is configured to homomorphically encrypt the first intermediate data by using the associated key to obtain homomorphically encrypted first intermediate data. The first transmission data determination unit is configured to determine the homomorphically encrypted first original data and the homomorphically encrypted first intermediate data as the first transmission data.

Further, the first intermediate data homomorphic encryption unit includes a second random number calculation subunit and a second random number homomorphic encryption subunit. The second random number calculation subunit is configured to calculate a second random number according to the associated key. The second random number homomorphic encryption subunit is configured to homomorphically encrypt the first intermediate data according to the second random number.

Further, the first intermediate data includes an expectation of the first original data and/or a variance of the first original data.

Further, the first intermediate data addition subunit is configured to: acquire a public key sent by the auxiliary node; and encrypt the homomorphically encrypted first intermediate data according to the public key, and determine the homomorphically encrypted first original data and the public-key encrypted first intermediate data as the first transmission data so that the auxiliary node decrypts the public-key encrypted first intermediate data by using a private key to obtain the homomorphically encrypted first intermediate data.

Further, the correlation coefficient acquisition apparatus further includes a sample data screening module. A sample data set for training a federal model includes the first original data and the sample data screening module is configured to screen the first original data included in the sample data set according to the correlation coefficients between the first original data and the second original data.

The correlation coefficient acquisition apparatus described above may perform the correlation coefficient acquisition method provided in any of the embodiments of the present disclosure, and has corresponding functional modules and beneficial effects for performing the correlation coefficient acquisition method.

Figure 7:
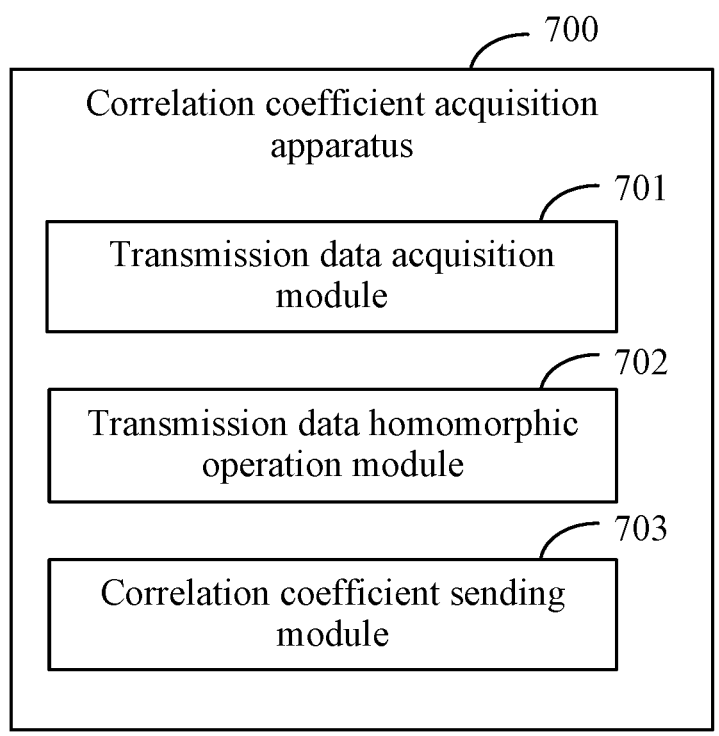
FIG. 7 is a schematic diagram of a correlation coefficient acquisition apparatus according to an embodiment of the present disclosure.

According to the embodiments of the present disclosure, FIG. 7 is a structural diagram of a correlation coefficient acquisition apparatus in an embodiment of the present disclosure, and the embodiment of the present disclosure is applicable to a case where a correlation between original data of two participation nodes is calculated. The apparatus is implemented by software and/or hardware and is configured in an electronic device with certain data operation capability, and the electronic device is the participation node.

As shown in FIG. 7, a correlation coefficient acquisition apparatus 700 includes a transmission data acquisition module 701, a transmission data homomorphic operation module 702, and a correlation coefficient sending module 703. The transmission data acquisition module 701 is configured to receive first transmission data sent by a first participation node and second transmission data sent by a second participation node. The transmission data homomorphic operation module 702 is configured to perform a homomorphic operation on the first transmission data and the second transmission data to obtain correlation coefficients between first original data and second original data, where the first transmission data is determined by the first participation node homomorphically encrypting the first original data by using an associated key, the second transmission data is determined by the second participation node homomorphically encrypting the second original data by using the associated key, and the associated key is jointly agreed by the first participation node and the second participation node. The correlation coefficient sending module 703 is configured to send the correlation coefficients to the first participation node and the second participation node.

According to the technical scheme, the homomorphic operation is performed on homomorphically encrypted first transmission data and homomorphically encrypted second transmission data through the auxiliary node to obtain the correlation coefficients between the first original data and the second original data before the homomorphic encryption, so that in a case where the auxiliary node cannot decrypt the transmission data, the correlation coefficients between the original data are accurately calculated, the safety of the original data is improved, privacy information is protected, the data transmission safety and the calculation safety are improved, and meanwhile, the calculation accuracy of the correlation coefficients is improved.

Further, the transmission data homomorphic operation module 702 includes a key pair acquisition unit, a first intermediate data decryption unit, a second intermediate data decryption unit, and a homomorphic operation unit. The key pair acquisition unit is configured to acquire a key pair, where a public key in the key pair is used for being sent to the first participation node and the second participation node for a data encryption. The first intermediate data decryption unit is configured to decrypt public-key encrypted first intermediate data in the first transmission data according to a private key in the key pair to obtain homomorphically encrypted first intermediate data. The second intermediate data decryption unit is configured to decrypt public-key encrypted second intermediate data in the second transmission data according to the private key in the key pair to obtain homomorphically encrypted second intermediate data. The homomorphic operation unit is configured to perform the homomorphic operation on the homomorphically encrypted first intermediate data, homomorphically encrypted first original data included in the first transmission data, the homomorphically encrypted second intermediate data, and homomorphically encrypted second original data included in the second transmission data.

The correlation coefficient acquisition apparatus described above may perform the correlation coefficient acquisition method provided in any of the embodiments of the present disclosure, and has corresponding functional modules and beneficial effects for performing the correlation coefficient acquisition method.

In the technical schemes of the present disclosure, the collection, storage, use, processing, transmission, provision and disclosure and the like of the involved user personal information are in compliance with the provisions of relevant laws and regulations, and do not violate the common customs of public sequences.

According to the embodiments of the present disclosure, the present disclosure further provides an electronic device, a readable storage medium and a computer program product.

Figure 8:
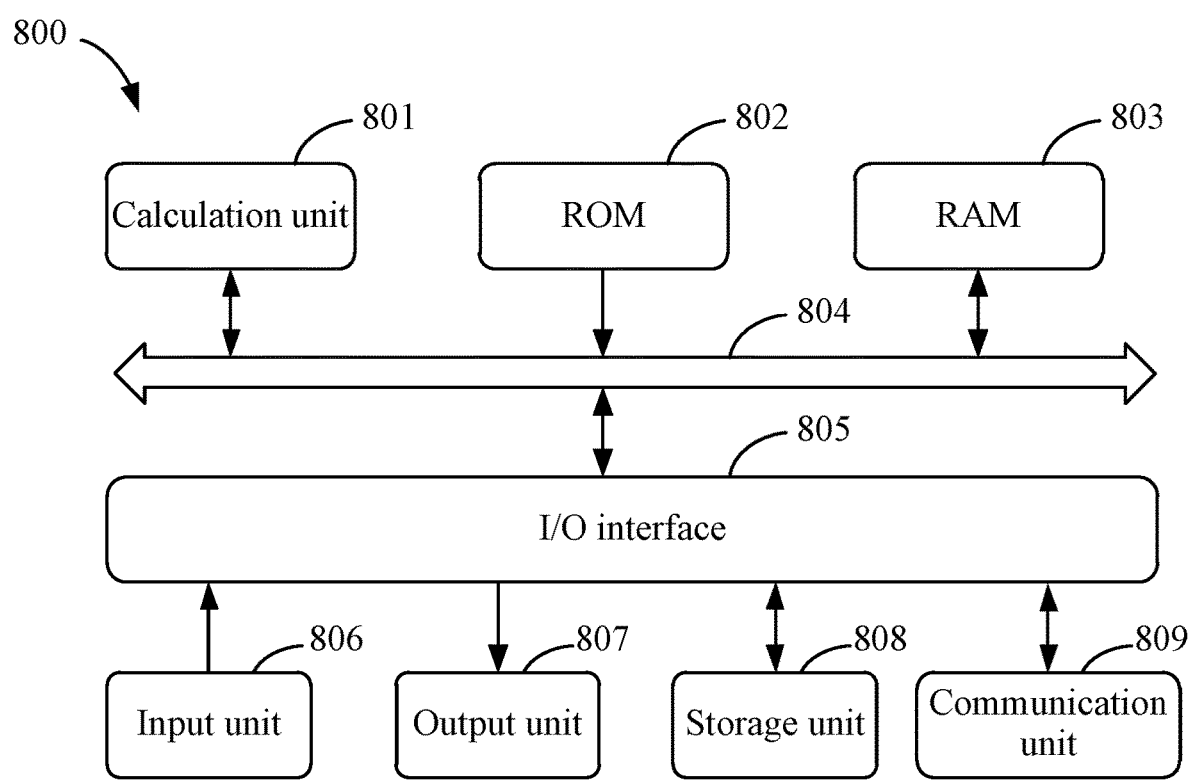
FIG. 8 is a block diagram of an electronic device for implementing a correlation coefficient acquisition method according to an embodiment of the present disclosure.

FIG. 8 shows a schematic area diagram of an exemplary electronic device 800 that may be used for implementing the embodiments of the present disclosure. The electronic device is intended to represent various forms of digital computers, such as laptops, desktops, workstations, personal digital assistants, servers, blade servers, mainframe computers, and other appropriate computers. The electronic device may also represent various forms of mobile devices, such as personal digital processing, cellphones, smartphones, wearable devices, and other similar calculating devices. The components shown herein, their connections and relationships between these components, and the functions of these components, are illustrative only and are not intended to limit implementations of the present disclosure described and/or claimed herein.

As shown in FIG. 8, the electronic device 800 includes a calculation unit 801, the calculation unit 801 may perform various appropriate actions and processes according to a computer program stored in a read-only memory (ROM) 802 or a computer program loaded from a storage unit 808 into a random-access memory (RAM) 803. The RAM 803 may also store various programs and data required for the operation of the electronic device 800. The calculation unit 801, the ROM 802, and the RAM 803 are connected to each other via a bus 804. An input/output (I/O) interface 805 is also connected to the bus 804.

Multiple components in the electronic device 800 are connected to the I/O interface 805, and the multiple components include an input unit 806 such as a keyboard or a mouse, an output unit 807 such as various types of displays or speakers, the storage unit 808 such as a magnetic disk or an optical disk, and a communication unit 809 such as a network card, a modem or a wireless communication transceiver. The communication unit 809 allows the electronic device 800 to exchange information/data with other devices over a computer network such as the Internet and/or various telecommunication networks.

The calculation unit 801 may be a variety of general-purpose and/or dedicated processing assemblies having processing and calculating capabilities. Some examples of the calculation unit 801 include, but are not limited to, a central processing unit (CPU), a graphics processing unit (GPU), a special-purpose artificial intelligence (AI) calculating chip, various calculation units executing machine learning model algorithms, a digital signal processor (DSP) and any suitable processor, controller and microcontroller. The calculation unit 801 performs the various methods and processes described above, such as the correlation coefficient acquisition method. For example, in some embodiments, the correlation coefficient acquisition method may be implemented as computer software programs tangibly embodied in a machine-readable medium, such as the storage unit 808. In some embodiments, part or all of computer programs may be loaded and/or installed on the electronic device 800 via the ROM 802 and/or the communication unit 809. When the computer program is loaded to the RAM 803 and executed by the calculation unit 801, one or more steps of the video generation method described above may be executed. Alternatively, in other embodiments, the calculation unit 801 may be configured, in any other suitable manners (e.g., by means of firmware), to perform the correlation coefficient acquisition method.

Various implementations of the systems and technologies described above herein may be achieved in digital electronic circuit systems, integrated circuit systems, field-programmable gate arrays (FPGAs), application-specific integrated circuits (ASICs), application-specific standard products (ASSPs), systems on chip (SOCs), complex programmable logic devices (CPLDs), computer hardware, firmware, software, and/or combinations thereof. These various implementations may include implementation in one or more computer programs, and the one or more computer programs are executable and/or interpretable on a programmable system including at least one programmable processor, the programmable processor may be a special-purpose or general-purpose programmable processor for receiving data and instructions from a memory system, at least one input device and at least one output device and transmitting data and instructions to the memory system, the at least one input device and the at least one output device.

Program codes for implementing the methods of the present disclosure may be written in any combination of one or more programming languages. These program codes may be provided for the processor or controller of a general-purpose computer, a special-purpose computer, or another programmable video generation apparatus to enable the functions/operations specified in a flowchart and/or a block diagram to be implemented when the program codes are executed by the processor or controller. The program codes may be executed entirely on a machine, partly on the machine, as a stand-alone software package, partly on the machine and partly on a remote machine, or entirely on the remote machine or server.

In the context of the present disclosure, a machine-readable medium may be a tangible medium that may contain or store a program available for an instruction execution system, apparatus or device or a program used in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any appropriate combination of the foregoing. More specific examples of the machine-readable storage medium may include an electrical connection based on one or more wires, a portable computer diskette, a hard disk, a random access memory (RAM), a read-only memory (ROM), an erasable programmable read-only memory (EPROM) or a flash memory, an optical fiber, a portable compact disc read-only memory (CD-ROM), an optical storage device, a magnetic storage device, or any appropriate combination of the foregoing.

To provide the interaction with a user, the systems and technologies described here may be implemented on a computer. The computer has a display device (such as, a cathode-ray tube (CRT) or liquid-crystal display (LCD) monitor) for displaying information to the user; and a keyboard and a pointing device (such as, a mouse or a trackball) through which the user may provide input to the computer. Other kinds of devices may also be used for providing for interaction with the user; for example, feedback provided to the user may be sensory feedback in any form (such as, visual feedback, auditory feedback, or haptic feedback); and input from the user may be received in any form (including acoustic input, speech input, or haptic input).

The systems and technologies described here may be implemented in a calculating system including a back-end component (such as, a data server), or a calculating system including a middleware component (such as, an application server), or a calculating system including a front-end component (such as, a client computer having a graphical user interface or a web browser through which the user may interact with the implementations of the systems and technologies described herein), or a calculating system including any combination of such back-end component, middleware component, or front-end component. The components of the system may be interconnected by any form or medium of digital data communication (such as, a communication network). Examples of the communication network include a local area network (LAN), a wide area network (WAN) and the Internet.

The computer system may include a client and a server. The client and the server are generally remote from each other and typically interact through a communication network. The relationship of client and server arises by virtue of computer programs running on the respective computers and having a client-server relationship to each other. The server may be a cloud server, a server of a distributed system, or a server combined with a blockchain.

It should be understood that various forms of the flows shown above, reordering, adding or deleting steps may be used. For example, the steps described in the present disclosure may be executed in parallel, sequentially or in different orders as long as the desired result of the technical scheme provided in the present disclosure may be achieved, and the execution sequence of these steps is not limited herein.

The above implementations should not be construed as limiting the protection scope of the present disclosure. It should be understood by those skilled in the art that various modifications, combinations, sub-combinations and substitutions may be made, depending on design requirements and other factors. Any modification, equivalent replacement, and improvement made within the spirit and principle of the present disclosure should be included within the protection scope of the present disclosure.

What is claimed is:

1. A correlation coefficient acquisition method, applied to a first participation node, comprising:
   acquiring first original data, and homomorphically encrypting the first original data by using an associated key to determine first transmission data, wherein the associated key is jointly agreed by the first participation node and a second participation node;
   sending the first transmission data to an auxiliary node so that the auxiliary node receives the first transmission data and performs a homomorphic operation on the first transmission data and second transmission data to obtain correlation coefficients between the first original data and second original data, wherein the second transmission data is determined by the second participation node homomorphically encrypting the second original data by using the associated key; and
   receiving the correlation coefficients fed back by the auxiliary node;
   wherein a sample data set used for training a federal model comprises the first original data, and the method further comprises:
   screening the first original data comprised in the sample data set according to the correlation coefficients between the first original data and the second original data.

2. The method of claim 1, wherein homomorphically encrypting the first original data by using the associated key comprises:

calculating a first random number according to the associated key; and
homomorphically encrypting the first original data according to the first random number.

3. The method of claim 1, wherein homomorphically encrypting the first original data by using the associated key to determine the first transmission data comprises:
homomorphically encrypting the first original data by using the associated key to obtain homomorphically encrypted first original data;
calculating first intermediate data according to the first original data and a calculation formula of the correlation coefficients;
homomorphically encrypting the first intermediate data by using the associated key to obtain homomorphically encrypted first intermediate data; and
determining the homomorphically encrypted first original data and the homomorphically encrypted first intermediate data as the first transmission data.

4. The method of claim 3, wherein homomorphically encrypting the first intermediate data by using the associated key to obtain the homomorphically encrypted first intermediate data comprises:
calculating a second random number according to the associated key; and
homomorphically encrypting, according to the second random number, the first intermediate data to obtain the homomorphically encrypted first intermediate data.

5. The method of claim 4, wherein determining the homomorphically encrypted first original data and the homomorphically encrypted first intermediate data as the first transmission data comprises:
acquiring a public key sent by the auxiliary node; and
encrypting the homomorphically encrypted first intermediate data according to the public key, and determining the homomorphically encrypted first original data and public-key encrypted first intermediate data as the first transmission data so that the auxiliary node decrypts the public-key encrypted first intermediate data by using a private key to obtain the homomorphically encrypted first intermediate data.

6. The method of claim 3, wherein the first intermediate data comprises at least one of an expectation of the first original data or a variance of the first original data.

7. A correlation coefficient acquisition method, applied to an auxiliary node, comprising
receiving first transmission data sent by a first participation node and second transmission data sent by a second participation node;
performing a homomorphic operation on the first transmission data and the second transmission data to obtain correlation coefficients between first original data and second original data, wherein the first transmission data is determined by the first participation node homomorphically encrypting the first original data by using an associated key, the second transmission data is determined by the second participation node homomorphically encrypting the second original data by using the associated key, and the associated key is jointly agreed by the first participation node and the second participation node; and
sending the correlation coefficients to the first participation node and the second participation node;
wherein performing the homomorphic operation on the first transmission data and the second transmission data comprises:

acquiring a key pair, wherein a public key in the key pair is used for being sent to the first participation node and the second participation node for a data encryption;
decrypting, according to a private key in the key pair, public-key encrypted first intermediate data in the first transmission data to obtain homomorphically encrypted first intermediate data;
decrypting, according to the private key in the key pair, public-key encrypted second intermediate data in the second transmission data to obtain homomorphically encrypted second intermediate data; and
performing the homomorphic operation on the homomorphically encrypted first intermediate data, homomorphically encrypted first original data comprised in the first transmission data, the homomorphically encrypted second intermediate data, and homomorphically encrypted second original data comprised in the second transmission data.

8. An electronic device, comprising:
at least one processor; and
a memory communicatively connected to the at least one processor;
wherein the memory stores an instruction executable by the at least one processor, and the instruction, when executed by the at least one processor, causes the at least one processor to perform:
acquiring first original data, and homomorphically encrypting the first original data by using an associated key to determine first transmission data, wherein the associated key is jointly agreed by the first participation node and a second participation node;
sending the first transmission data to an auxiliary node so that the auxiliary node receives the first transmission data and performs a homomorphic operation on the first transmission data and second transmission data to obtain correlation coefficients between the first original data and second original data, wherein the second transmission data is determined by the second participation node homomorphically encrypting the second original data by using the associated key; and
receiving the correlation coefficients fed back by the auxiliary node;
wherein a sample data set used for training a federal model comprises the first original data, and the instruction, when executed by the at least one processor, causes the at least one processor to further perform:
screening the first original data comprised in the sample data set according to the correlation coefficients between the first original data and the second original data.

9. The electronic device of claim 8, wherein the instruction, when executed by the at least one processor, causes the at least one processor to perform homomorphically encrypting the first original data by using the associated key in the following way:
calculating a first random number according to the associated key; and
homomorphically encrypting the first original data according to the first random number.

10. The electronic device of claim 8, wherein the instruction, when executed by the at least one processor, causes the at least one processor to perform homomorphically encrypting the first original data by using the associated key to determine the first transmission data in the following way:

homomorphically encrypting the first original data by using the associated key to obtain homomorphically encrypted first original data;

calculating first intermediate data according to the first original data and a calculation formula of the correlation coefficients;

homomorphically encrypting the first intermediate data by using the associated key to obtain homomorphically encrypted first intermediate data; and determining the homomorphically encrypted first original data and the homomorphically encrypted first intermediate data as the first transmission data.

11. The electronic device of claim 10, wherein the instruction, when executed by the at least one processor, causes the at least one processor to perform homomorphically encrypting the first intermediate data by using the associated key to obtain the homomorphically encrypted first intermediate data in the following way:

calculating a second random number according to the associated key; and homomorphically encrypting, according to the second random number, the first intermediate data to obtain the homomorphically encrypted first intermediate data.

12. The electronic device of claim 11, wherein the instruction, when executed by the at least one processor, causes the at least one processor to perform determining the homomorphically encrypted first original data and the homomorphically encrypted first intermediate data as the first transmission data in the following way:

acquiring a public key sent by the auxiliary node; and encrypting the homomorphically encrypted first intermediate data according to the public key, and determining the homomorphically encrypted first original data and public-key encrypted first intermediate data as the first transmission data so that the auxiliary node decrypts the public-key encrypted first intermediate data by using a private key to obtain the homomorphically encrypted first intermediate data.

13. The electronic device of claim 10, wherein the first intermediate data comprises at least one of an expectation of the first original data or a variance of the first original data.

14. An electronic device, comprising:

at least one processor; and a memory communicatively connected to the at least one processor;

wherein the memory stores an instruction executable by the at least one processor, and the instruction, when executed by the at least one processor, causes the at least one processor to perform the correlation coefficient acquisition method of claim 7.

15. A non-transitory computer readable storage medium storing a computer instruction, wherein the computer instruction is configured to cause a computer to perform the correlation coefficient acquisition method of claim 1.

16. A non-transitory computer readable storage medium storing a computer instruction, wherein the computer instruction is configured to cause a computer to perform the correlation coefficient acquisition method of claim 7.

* * * * *